W. H. UNDERWOOD.
ORCHARD HEATING APPARATUS.
APPLICATION FILED DEC. 21, 1910.
994,223.
Patented June 6, 1911.
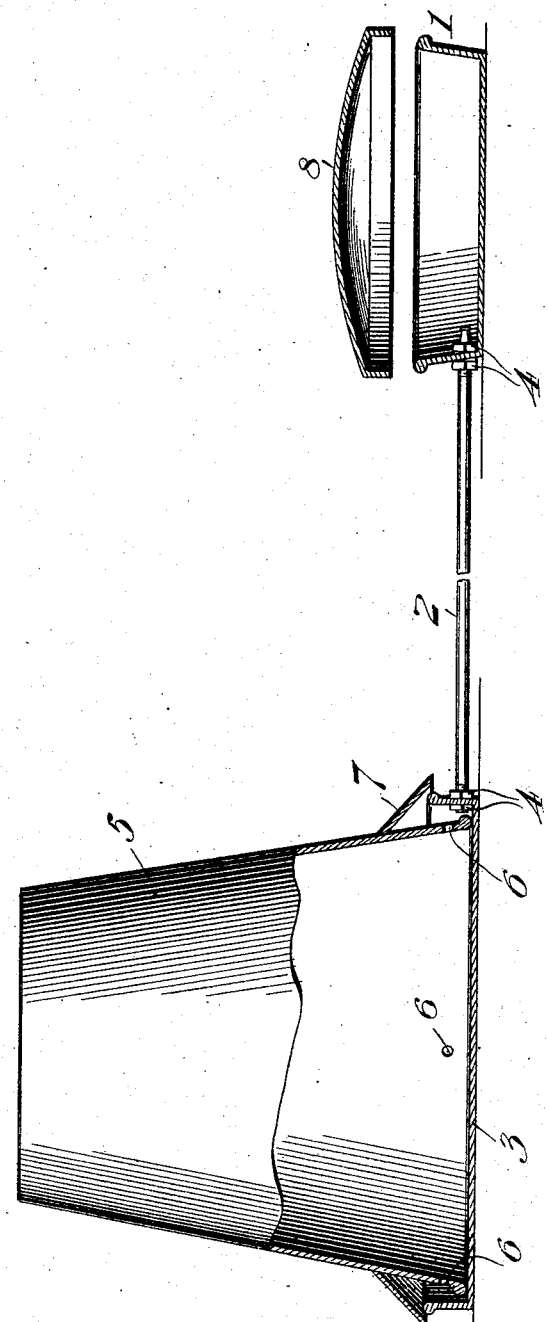
WITNESSES
INVENTOR
Walter H. Underwood
By
Attorney

UNITED STATES PATENT OFFICE.

WALTER H. UNDERWOOD, OF HUTCHINSON, KANSAS.

ORCHARD-HEATING APPARATUS.

994,223.  Specification of Letters Patent.  Patented June 6, 1911.

Application filed December 21, 1910. Serial No. 598,572.

*To all whom it may concern:*

Be it known that I, WALTER H. UNDERWOOD, a citizen of the United States, residing at Hutchinson, in the county of Reno and State of Kansas, have invented certain new and useful Improvements in Orchard-Heating Apparatus, of which the following is a specification.

The present invention relates to certain new and useful improvements in orchard heating apparatus, and the object of the invention is the provision of a device of this character which is extremely simple and inexpensive in its construction, which can be readily installed in an orchard, and which embodies novel features of construction whereby it will operate at a greatly reduced amount of labor over any other pot in existence and operate more efficiently than any pot now in existence, and also operate with a steady flame whereas with the other pots the flame is reduced as they burn down.

A further object of the invention is the provision of an orchard heater which is so constructed as to burn steadily and give off a uniform amount of heat as long as there is any fuel in the reservoir, without the necessity of any attention to the device after it has once been started.

The invention still further contemplates an orchard heater which will burn a very heavy and low grade oil without danger of any of the parts becoming clogged so as to check the flow of oil and prevent the necessary amount of oil reaching the burner.

A still further object of the invention is to provide an orchard heater comprising extremely few and durable parts which are designed in such a manner that they can be readily assembled for use or taken apart and packed in a small amount of space for storage or shipment.

With these and other objects in view, the invention consists in the construction and novel combination of parts, hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Reference is to be had to the accompanying drawing which shows a sectional view of an orchard heating apparatus constructed in accordance with the present invention.

Corresponding and like parts are referred to in the following description and indicated in all the views of the drawing by the same reference characters.

Specifically describing the present embodiment of the invention, the numeral 1 designates the burner pan which preferably has a flat and shallow formation and within which the oil or fuel is burned. A pipe 2 leads from a supply pan 3 to the burner pan, the extremities of the said pipe preferably projecting through the sides of the said pans and being threaded for the reception of the clamping nuts 4 which serve to retain the pipe securely in engagement with the pans when the device is in operation. However, by loosening the outermost nuts, the pipe can be detached from the pans and the various parts packed in a very small amount of space for shipment or storage. Both the burner pan 1 and the supply pan 3 are arranged on substantially the same level so that oil will flow through the pipe 2 into the burner pan by the action of gravity. The oil or liquid fuel is maintained at a constant level within the supply pan 3 by means of an inverted reservoir 5 which has the lower end thereof received within the pan and acts as a fountain to supply oil thereto. A number of openings 6 are formed in the sides of the inverted reservoir 5 at a point toward the bottom thereof, the said openings being arranged below the top of the sides of the supply pan 3. As long as the level of the oil within the supply pan is above the openings 6, the oil will be retained within the inverted reservoir by atmospheric pressure, but as soon as the level of the oil within the supply pan falls below the top of the openings 6, air will enter the inverted reservoir through the said openings and oil will flow from the reservoir into the supply pan until the level of the oil within the said supply pan again rises above the openings 6. In this manner, the oil within the supply pan is maintained automatically at a fixed level as long as any oil remains in the reservoir. The reservoir is shown as having a tapered formation and as surrounded toward the lower end thereof with a downwardly inclined annular flange 7 which projects over the sides of the supply pan 3 and acts as a water shed to prevent rain or moisture from reaching the oil within the pan. This flange 7 may either be integral with the reservoir or in the nature of a removable ring which is slipped over the tapered end of the reservoir and frictionally engages the same. A removable cover 8 is provided for the burner pan 1, the said cover serving both as a means for extinguishing the flame and also as a cover to prevent rain or the like from reaching the interior of the pan and contaminating the oil therein.

In the use of the device, the reservoir is filled with oil when in an upright position and inverted after the supply pan 3 has been applied to the open end thereof. After the reservoir has been inverted, a constant level of oil will be maintained within the supply pan, and this oil will flow through the pipe 2 so as to also maintain a constant level of oil within the burner pan 1. It will be obvious, that as long as the device is in operation the burner will give off a uniform amount of heat, since there is always the same amount of oil in the burner pan and the surface of the oil is always the same distance from the top of the pan. This is a very material advantage over those orchard heaters in which the oil is burned in a receptacle or pot where the surface of the oil is lowered as the oil is consumed. With this type of heater, the flame gradually becomes smaller as the oil is consumed, and the amount of heat radiated gradually decreases, while the temperature of the atmosphere is constantly becoming lower so that there is a demand for a greater rather than a less amount of heat. Attention is also directed to the fact that with the present device no valve is necessary to regulate the flow of oil from the reservoir to the burning pan, since this flow of oil automatically regulates itself after the burner has once been started. This is a very advantageous feature, since it eliminates the necessity of visiting the heater at intervals throughout the night to see that the oil is feeding properly, and also enables a heavier and lower grade of oil to be utilized than would otherwise be possible. It has been found impossible to use these heavy and low grade oils in connection with a valve, since the valves are continually becoming choked up and either feed too much or too little oil. With the present device, there are no parts which can be choked up with this heavy oil, and a constant supply thereof to the burner pan is insured without any further attention after the device has once been set in operation.

Where an orchard heater is employed which embodies a valve, it is necessary to keep attendants running up and down the rows to either turn off or on the valves in order to maintain a constant flow of the oil, and where the oil is merely burned in pots, it is also necessary to keep the operators busy filling the pots in order to maintain the surface of the oil at the top thereof, since as soon as the surface of the oil is lowered within the pots, the supply of air to the oil is decreased and the flame lowered so as to render the heater ineffective. With the present device there is no valve to require a constant attention, and yet the oil is always maintained at the same level within the burner. The necessity of constant attention to the burner throughout the night is thereby avoided, since as long as there is any oil in the reservoir, the burner will maintain a constant flame and give forth a uniform amount of heat. This is a very important feature, since it greatly reduces the expense incident to operating the burner, and also eliminates the possibility of the burner becoming low and ineffective at a critical time during the night. In other words, it is the broad idea of an orchard heater which is constructed without a valve and in which the oil is fed to the burner from a reservoir and is automatically maintained at a certain level within the burner that is the essence of the present invention.

Having thus described the invention, what I claim as new and desire to secure by Letters Patent, is:—

1. In an orchard heater, the combination of a supply pan, an inverted liquid fuel reservoir resting directly upon the bottom of the supply pan and provided at a point within the said supply pan with a lateral opening whereby the liquid fuel is automatically maintained at a constant level within the supply pan, a burner pan arranged on substantially the same level with the supply pan and adapted to have the fuel burned directly therein, and a pipe establishing communication between the supply pan and the burner pan.

2. In an orchard heater, the combination of a supply pan, a burner pan arranged on substantially the same level as the supply pan and adapted to have liquid fuel burned directly therein, a pipe connecting the supply pan and burner pan and extending through openings in the sides thereof, the ends of the pipe being threaded, nuts applied to the threaded ends of the pipe for clamping the burner pan and supply pan thereto, and an inverted reservoir applied to the supply pan and constructed to automatically maintain the fuel at a fixed level therein.

3. In an orchard heating apparatus, the combination of a supply pan, an inverted liquid fuel reservoir resting directly upon the bottom of the supply pan and provided at a point within the supply pan with a lateral opening whereby the liquid fuel is automatically maintained at a fixed level within the supply pan, a burner pan arranged on substantially the same level as the supply pan and adapted to have the liquid fuel burned directly therein, a pipe connecting the supply pan to the burner pan, and a downwardly inclined annular flange surrounding the liquid fuel reservoir and projecting over the sides of the supply pan.

4. In an orchard heater, the combination of a supply pan, an inverted liquid fuel reservoir resting removably upon the bottom of the supply pan and provided at a point within the said supply pan with a lateral opening whereby liquid fuel is automatically maintained at a constant level within the supply pan, the said liquid fuel reservoir having a tapered formation, a flange fitted upon the tapered sides of the reservoir and projecting over the sides of the supply pan, a burner pan, and a pipe leading from the supply pan to the burner pan.

In testimony whereof I hereunto affix my signature in the presence of two witnesses.

WALTER H. UNDERWOOD.

Witnesses:
ERWIN W. MOORE,
ARTHUR GALLOWAY.

---

Copies of this patent may be obtained for five cents each, by addressing the "Commissioner of Patents, Washington, D. C."